United States Patent [19]

Rothfuss et al.

[11] Patent Number: 4,545,568

[45] Date of Patent: Oct. 8, 1985

[54] UNFIRED REFRACTORY STRUCTURAL MEMBER IN THE FORM OF A PLATE FOR USE AS AN EXPENDABLE LINING OF METALLURGICAL VESSELS

[75] Inventors: Hans Rothfuss; Günter Wieland, both of Wiesbaden; Peter Schreiter, Hünstetten-Wallrabenstein, all of Fed. Rep. of Germany

[73] Assignee: Didier-Werke AG, Wiesbaden, Fed. Rep. of Germany

[21] Appl. No.: 581,364

[22] Filed: Feb. 17, 1984

[30] Foreign Application Priority Data

Feb. 24, 1983 [DE] Fed. Rep. of Germany ....... 3306423

[51] Int. Cl.$^4$ .......................... F27B 1/00; C08K 3/22
[52] U.S. Cl. .................... 266/280; 266/284; 266/285; 501/83; 501/95; 501/111; 501/117; 501/118
[58] Field of Search ...................... 501/81, 83, 95, 111, 501/116, 117, 118; 266/280, 284, 285

[56] References Cited

U.S. PATENT DOCUMENTS

| | | | |
|---|---|---|---|
| 1,854,899 | 4/1932 | Goldschmidt | 501/83 |
| 2,087,107 | 7/1937 | Heuer | 501/116 |
| 2,341,561 | 2/1944 | Kinzie et al. | 501/83 |
| 3,304,187 | 2/1967 | Limes et al. | 501/111 |
| 4,048,134 | 9/1977 | Courtenay et al. | 260/38 |

FOREIGN PATENT DOCUMENTS 65034  11/1982  European Pat. Off. .............. 501/95

*Primary Examiner*—L. Dewayne Rutledge
*Assistant Examiner*—Christopher W. Brody
*Attorney, Agent, or Firm*—Wenderoth, Lind & Ponack

[57] ABSTRACT

Unfired refractory structural member in the form of a plate for the expendable lining of metallurgical vessels, especially for tundishes used in continuous steel casting, and comprising magnesia sinter and possibly olivine with a grading of 30–45% by weight under 0.09 mm, and 55–70% by weight 0.09 to 4 mm, including 20–40% by weight over 1 mm; cork or granulated ceramic fibers as a pore-forming material; an inorganic binder; and possibly other additives. This refractory structural member has good strength, a small ignition loss, a low content of volatile hydrogen-containing substances, a favorable peeling behavior, and good resistance to slag and molten steel.

17 Claims, No Drawings

4,545,568

UNFIRED REFRACTORY STRUCTURAL MEMBER IN THE FORM OF A PLATE FOR USE AS AN EXPENDABLE LINING OF METALLURGICAL VESSELS

BACKGROUND OF THE INVENTION

The present invention relates to an unfired refractory structural member in the form of a plate, for use as an expendable lining of metallurgical vessels, including ladles for molten steel, and more particularly, tundishes used in continuous steel casting. The structural member is made of a mixture comprising magnesia sinter and possibly olivine, an inorganic binder, a pore-forming material and possibly other additives, and water, by shaping, setting and drying.

The invention also relates to the use of this structural member as an expendable lining of a metallurgical vessel, particularly a tundish used in continuous steel casting.

In many cases, metallurgical vessels for molten steel have a refractory lining consisting of an outer lining which clings to the outer metal jacket and is composed of refractory bricks or another refractory material, and an inner or expendable lining which must often be replaced. According to Examined West German Specification No. 26 40 207, in order to protect surfaces that are exposed to fused metal, slags or hot gases, strongly compressed ceramically bound, mosaic-type refractory surface elements are provided which, among other things, can also be employed for tundishes used in continuous steel casting. However, these surface elements have a high apparent density, and particularly because of the large number of joints formed, do not lead to a satisfactory increase in the durability of the vessel lining.

An expendable lining for tundishes is disclosed in Unexamined West German Application No. 22 59 553, and consists of a lining of plates from a refractory heat-insulating material containing a refractory filler, refractory fibers, and an organic binder, such as starch or formaldehyde resin. The plates enable the molten steel to be supplied without previously heating the vessel. The heating by the molten steel should lead to a carbonization of the organic components and to a sintering of the inorganic components, so that the plates, prior to wetting and infiltration, are protected by the molten metal, and an easy breakability is attained when the expendable lining is removed. However, in many cases, the high ignition loss caused by the organic components and the production of carbohydrates is not desired. Furthermore, as the temperature rises, the strength of the plates diminishes considerably and the sintering remains limited to an external narrow area of the plates so that, particularly in the case of a varying meniscus, the expendable lining can easily be damaged.

Unexamined West German Application No. 27 16 092 discloses an expendable lining in the form of plates whose inner surface abuts the permanent lining and which is composed of sand, quartz powder, sintering means, mineral wool, paper, an organic binder and an inorganic binder. However, these plates also have a high ignition loss and the development of their strength through sintering its unsatisfactory.

European Pat. No. 0042897 provides, as an expendable lining, a mixture consisting of 65 to 85 parts by weight of magnesia sinter and 10 to 30 parts by weight of a finely powdered material (hydrated inorganic material) such as light magnesia, sodium phosphate or aluminum hydroxide, the mixture being formed from a watery suspension. However, plates made from the mixture, with a large amount of the very finely powdered reactive material, do not possess a uniform strength or a long durability and, during preheating, a structure is produced that is full of cracks.

Furthermore, an article published in "Keramische Zeitschrift", 33, 1981, page 518, table 8, proposes the use of plates made of magnesium oxide as inner lining for tundishes used in continuous steel casting. However, these plates have a high ignition loss of 7 to 10% by weight.

SUMMARY OF THE INVENTION

The primary object of the invention is to produce an unfired refractory structural member in the form of a plate, suitable for use as an expendable lining for metallurgical vessels which, besides having a greater and more uniform strength and a deep-reaching sintering as compared to prior art expendable linings, also exhibits a longer durability, a lower ignition loss, and a lower content of volatile hydrogen-containing substances than the prior linings. At the same time, however, the structural member shall be resistant to voltages and temperature variations in such a way that the expendable lining, for example for a tundish, built up with the plates, can be put into operation without previous heating.

This object is accomplished, in accordance with the present invention, by a structural member having a low ignition loss, and comprising magnesia sinter and optionally olivine, having a certain grain size classification; a pore-forming material having a certain grain size; and an inorganic bonding agent.

DETAILED DESCRIPTION OF THE INVENTION

More specifically, the present invention provides an unfired refractory structural member in the form of a plate, suitable for use as an expendable lining for a metallurgical vessel, comprising 20–100 parts by weight of magnesia sinter and 0–80 parts by weight of olivine, said magnesia sinter and olivine together having a grain size classification of 30–45% by weight of under 0.09 mm, and 55–70% by weight of 0.09–4 mm wherein 20–40% by weight of the total grains are over 1 mm; a pore-forming material selected from the group consisting of (a) 1–2.5 parts by weight of cork having a grain size of up to 1 mm wherein at least 70% by weight of the grains are over 0.1 mm, and (b) 2–10 parts by weight of granulated ceramic fibers having a grain size of up to 4 mm; and an inorganic bonding agent; said structural member having an ignition loss of up to 0.6% by weight at 1000° C. after preliminary annealing at 400° C.

The structural member of this invention possesses a greater uniform strength than conventional structural members at low and high temperatures, a sintering that extends well into the interior areas of the structural member, good dimensional stability, and greater resistance than conventional structural members to slags and molten steel. On the other hand, the present structural member meets the conditions for resistance to voltages and temperature variations, a small ignition loss, and heat insulation against molten steel. The apparent density of the refractory structural member in the form of a plate preferably ranges from 2.0 to 2.4, more preferably from 2.1 to 2.3 g/cm³. These seemingly partly incompatible properties are surprising, and are probably attributable to the advantageous cooperation between the grading of the magnesia sinter, and the amounts of pore-forming material and inorganic binder, although it is difficult to fully comprehend the reasons therefor.

Another surprising finding is that the pore-finding material, besides reducing the apparent density and enhancing the heat-insulating property of the structural member, improves the strength and resistance to cracking in the presence of stresses. The granulated cork, up to an upper limit of 2.5 parts by weight, has a favorable effect on the strength of the structural member. The amount of granulated cork contained in the structural member depends on its bulk weight, which for a grain size of up to 1 mm, can amount to from 0.05 to over 0.1 g/cm$^3$. Thus, for cork with a low bulk weight, relatively low amounts can be provided in the structural member.

Preferably, at least 70% by weight of the cork grains have a size of 0.1-1 mm.

The granulated ceramic fibers are a material that is composed of mineral fibers of very small granules in compliance with DIN 52270, page 2, No. 2.2. In particular, ceramic fibers on the basis of aluminum silicate of 45% by weight $Al_2O_3$ in the form of clumps and agglomerates, as may be present when delivered, can be placed in a turbulent mixer which is also equipped with rotating cutter heads (turbomixer). in this turbomixer, fibrous aggregates are then formed of loosened and comminuted fibers, which form a loose granulation.

Preferably, the amount of granulated ceramic fibers is 3-6 parts by weight.

As the temperature rises, in the structural member embodying the principles of the invention, the granulated cork and ceramic fibers do not form carbon deposits as do other known organic pore-forming substances such as, in particular, sawdust, comminuted paper, coal, coke and granulated artificial resin, and at high temperatures results in the development of volatile gases. Instead, the evolution of carbohydrate-containing gases from any organic material and the release of chemically bound or accumulated water is already largely completed at 400° C., and at 1000° C. the ignition loss, determined on a test piece annealed at 400° C. and cooled in a dessicator, is not more than 0.6% by weight. In this way, a refractory structural member for the expendable lining of, for example, a tundish used in continuous steel casting, is available, which satisfactorily meets the requirement with regard to steel quality for a small ignition loss and the lowest possible hydrogen content. The small ignition loss also has a favorable impact on the fabrication of the structural members because of the inorganic binder in the mixture from which the structural members are formed.

The inorganic bonding agent is preferably used in an amount of 1-10 parts by weight. Especially preferred embodiments include the use of, as bonding agent, 2-4.5 parts by weight of a sodium phosphate, or 2-4.5 parts by weight of a sodium polyphosphate, calculated as anhydrous phosphate ($P_2O_5$). Examples of the sodium polyphosphate are those of the formula $Na_{n+2}P_nO_{3n+1}$ having a polymerization degree (n) of, preferably, at least 4, more preferably, 6-10.

It is also permissible to include other additives in the structural member of the present invention. For example, 0.2-2.5 parts by weight, preferably 1-2 parts by weight, of at least one additive selected from the group consisting of refractory clay and $Cr_2O_3$ can be incorporated in the structural member. Sodium bisulfate in an amount of 0.2-1 part by weight, preferably 0.4-1 part by weight, can also be incorporated in the structural member.

In the mixture, the sodium phosphate and sodium polyphosphate form with the refractory clay and/or $Cr_2O_3$, and with the pore-forming material, an advantageous bond. Addition of sodium bisulfate further increases the processability of the mixture and the strength of the structural member.

Compared with, for example, sodium polyphosphate, other conventional binders, such as an aqueous solution of sodium silicate and a solution of magnesium sulfate, have proved to be disadvantageous, because sodium silicate in particular has a very long hardening time, and a solution of magnesium sulfate has not resulted in satisfactory strengths above 800° C. Although the use of starch as an organic binder increases the strength, it also appreciably increases the ignition loss, which is limited and well-defined according to the present invention.

When using mixtures of magnesia sinter and olivine with the indicated grading, the magnesia sinter is used advantageously in fine particle sizes and the olivine in relatively large particle sizes. Preferably, the magnesia sinter is used as a powder with a grading below 0.1 mm in such mixtures.

The mixture is prepared in a usual manner, whereby any order of adding materials is appropriate, and wherein at least one portion of the water is added directly to the grain mixture of magnesia sinter and possibly olivine. The mixture can be formed, by means of the added water, as a mass capable of being compressed, rammed or vibrated. The amount of added water is approximately 6 to 9 parts by weight based on 100 parts by weight of the solids.

To make the structural member, the mixture, which is metered according to weight, is placed in a mold and shaped by ramming, compressing or vibrating, and is set by heating to 150° to 200° C. Advantageously, until at least its outer layer is set, the structural member can left in the mold consisting of a bottom part and a frame. After the set structural member has been released from the mold, it may be dried further at 110° to 200° C. A drying oven or a baking oven is suitable for the heating and drying.

Preferably, however, the shaping of the structural member is effected by means of a press according to a process known in the prior art. The mold has a fired bottom or bottom punch, a frame and a fired cover or upper punch. After filling the mixture in the mold and distributing a precompacting it by ramming or vibration, it is shaped, set and dried thoroughly in the mold under a light compracting pressure. It is then heated through the punch surfaces fired up to 150° to 200° C. so that, after a relatively short time of about 5 to 15 minutes, a plate can be released from the mold. Relatively large structural members require longer dwell times in the mold. For the shaping by means of the fired mold, a loose metal straining cloth may appropriately be placed between the upper punch and the mixture to facilitate the escape of water vapor and the release of the structural member from the mold.

The thickness of the structural member of the present invention is preferably 1-6 cm, more preferably 2-4 cm.

Of particular advantage is the use of the structural members of the invention in combination with a backup layer of 20-100 parts by weight of a dry granular magnesia sinter and 0 to 80 parts by weight of olivine, in a tundish.

In the past, the backup layer of refractory material placed behind the refractory plates of heat-insulating material, the latter being usually 2 to 3 cm thick, was provided during operation as a loose layer or, as disclosed in European application No. 0051910, as a layer slightly sintered with the refractory plates. Therefore, immediately after wear of the refractory plate, the lining composed of plates and backup layer had to be replaced.

By contrast, when using the plates for the expendable lining as in the present invention, the backup layer comprising a dry granular magnesia sinter and optionally olivine sinters into a new refractory material which, particularly with increasing consumption of the plate, is bonded thereto through sintering so that not only the thickness of the plate, but also the thickness of the backup layer, is available as a wearing layer. The thickness of the backup layer can be increased to at least 4 cm, up to 10 cm and more, so that, for example, a total of 12 cm of wearing layer is available before the permanent layer of refractory bricks can be reached by the molten steel. Furthermore, due to the relatively large thickness of the backup layer, the fill-up of this layer can be improved. According to the invention, it is possible to lengthen the heretofore normal life of a late lining from 2-4 hours to more than 15 hours.

The invention also provides for the use of an unfired refractory structural member in the form of a finished structural member or sections of a finished structural member prefabricated from several plates as an expendable plate-type lining inserted in front of the backup layer and possibly jointed thereto. This lining can be employed in vessels and launders for liquid metal and, more particularly, for tundishes used for continuous steel casting. With such prefabricated structural members or sections of prefabricated structural members, delivery of the vessels for molten metal can be effected in a relatively short time and with reduced work input.

The prefabricated structural member or sections of prefabricated structural members usually have a trapezoidal cross-section and are composed of plates whose edges are advantageously provided with a notch or spring. The inner surfaces of the structural member can be provided with a support stand, and its outer surfaces with a supporting framework turned toward the vessels of the launder. The support stand consisting, for example, of a wood or plate structure ensures the stability of the structural member until delivery. The supporting framework may consist of individual steel bands or a wire grating, by means of which the structural member is raised and lowered and, upon delivery, is placed on a horizontal layer composed of backup filler material. The structural member can also be surrounded with a shrink film which at the same time holds the support stand and the supporting framework together.

The unfired refractory structural member of the invention will be described in greater detail with reference to the examples shown below, without the invention being limited thereto. The quantities are indicated in parts by weight, and the grading in percent by weight.

In the examples, the mixtures were shaped and hardened into plates in a fired mold in a crumbly form and under a slight compacting pressure.

Magnesia sinter 1 in the table below contains approximately 96% MgO by weight, 2.3% CaO by weight, and 0.7% $SiO_2$ by weight, and has an apparent grain density of 3.37 g/cm$^3$. Magnesia sinter 2 has approximately 91% MgO by weight, 3.1% CaO by weight, 1.0% $SiO_2$ by weight, and 4.8% $Fe_2O_3$ by weight, and an apparent density of 3.13 g/cm$^3$. The olivine used was a material with 48.6% MgO by weight, 42.6% $SiO_2$ by weight, and 7.3% $Fe_2O_3$ by weight, and a bulk density of 3.19 g/cm$^3$. The finely powdered cork had a bulk weight of 0.11 g/cm$^3$. The fibrous granulated material obtained by means of a fluid mixer was obtained from ceramic fibers with 45% $Al_2O_3$ by weight. Chromium oxide, $Cr_2O_3$, was present in the fineness of a pigment. The binder, sodium polyphosphate with a basicity of approximately 1 (molar ratio of $Na_2O$ to $P_2O_5$) was added in the dissolved state in water to the mixture together with 5 to 8 parts by weight of water. When fabricating the plates from the mixture in the manner described above, a compacting pressure on the order of one N/mm$^2$ was applied.

Properties of the structural members in the examples: The apparent density is indicated in rounded-off values. To determine the bending strength, the plate-type structural members with the dimensions 400×450×30 mm were tested for a 300-mm span of the bearing edges. Test specimens of 78×70×30 mm were used to determine the compressive strength. The peeling behavior was judged on the basis of a shock treatment of the plate surface by means of a gas flame (burner with a capacity of 3300 g propane gas/hr, burner diameter of 85 mm, distance from the burner opening to the plate was approximately 350 mm). The cracks produced, their number and size were evaluated in the grades: slight, satisfactory, good (−, 0, +). The heat conductivity was determined according to the so-called plate process.

The structural member of Example 1, which does not lie within the scope of the present invention and which arises from a mixture without a pore-forming material, exhibits a high bulk density and good strength, but also inadequate behavior during the heating-up period and a high heat conductivity. In practice, these structural members prove to be prone to cracking and destruction as a result of rupture.

In Examples 2-5, which are based on mixtures with cork waste, the additional advantageous influence of sodium is evident in Examples 3-5. The change in properties by a relatively low apparent density is evident by comparing Examples 4 and 5 with Example 3. The apparent density of the plates can easily be varied in a known fashion by modifying the charge weight for a plate.

A high compressive strength is achieved by the use of fibrous granulated material (Examples 6-9). However, in practice the bending strength is of greater significance, so that the cork-containing plates are of limited advantage in this respect, as will become evident by comparing Example 3 with Example 7.

Examples 10-13 represent mixtures with gradings of magnesia sinter that are not within the scope of the invention, i.e. in which there are either too small amounts of grains under 0.09 mm or excessive amounts of coarse grains. Structural members made from these mixtures have low strengths and the grains easily wear away, i.e. the surfaces are subject to scuffing, and they have only limited heating-up properties.

Examples 14-16 illustrate mixtures for structural members based on magnesia sinter and olivine. The olivine used has a medium and coarse grain size.

| Examples | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Magnesia sinter 1 | X | X | X | X |   | X | X | X |   | X |   | X | X | X | X | X |
| Magnesia sinter 2 |   |   |   |   | X |   |   |   | X |   | X |   |   |   |   |   |
| Olivine |   |   |   |   |   |   |   |   |   |   |   |   |   |   | X | X | X |
| Grading: |   |   |   |   |   |   |   |   |   |   |   |   |   |   |   |   |
| >1–4 mm | 20 | 20 | 20 | 20 | 30 | 20 | 20 | 20 | 40 |   | 20 | 45 | 45 |   | 20 | 20 | 20 |
| 0.09–1 mm | 40 | 40 | 40 | 35 | 30 | 40 | 40 | 40 | 30 | 80 | 60 | 15 | 30 | 40 |   | 40 | 20 | 20 |
| <0.09 mm | 40 | 40 | 40 | 45 | 40 | 40 | 40 | 40 | 30 | 20 | 20 | 40 | 25 | 40 |   | 40 |   | 40 |
| Cork waste 0.5–1 mm |   | 2 | 2 | 2 | 2 |   |   |   |   |   |   |   |   | 2 |   | 2 | 2 |
| Fibrous granulated material up to 4 mm |   |   |   |   |   | 5 | 5 | 5 | 5 | 5 | 5 | 5 | 5 |   |   |   |   |
| Sodium polyphosphate | 3.5 | 3 | 3 | 4 | 4 | 3.5 | 3.5 | 3 | 4 | 4 | 4 | 4 | 3 | 3 | 4 | 3.5 |
| Clay (34% Al$_2$O$_3$ by weight) | 2 | 2 | 2 | 2 | 2 | 2 | 2 | 2 | 2 | 2 | 2 | 2 | 2 | 2 | 2 | 2 |
| Cr$_2$O$_3$ |   |   |   |   |   |   |   |   | 1 |   |   |   |   |   |   |   |
| Sodium bisulfate |   | 1 | 1 | 1 |   | 1 | 1 |   | 1 |   | 1 |   | 1 | 1 | 1 | 1 |
| Properties: |   |   |   |   |   |   |   |   |   |   |   |   |   |   |   |   |
| Bulk density g/cm$^3$ | 2.70 | 2.40 | 2.40 | 2.20 | 2.20 | 2.40 | 2.40 | 2.40 | 2.20 | 2.20 | 2.20 | 2.20 | 2.20 | 2.20 | 2.20 | 2.20 |
| Bending strength N/mm$^2$ | 7.0 | 2.0 | 7.5 | 3.8 | 3.4 | 1.8 | 4.5 | 3.2 | 3.1 | 0.2 | 1.7 | 0.9 | 1.2 | 2.6 | 2.4 | 3.0 |
| Compression strength N/mm$^2$ | 75 | 18 | 25 | 19 | 18 | 45 | 55 | 55 | 18 | 5 |   | 11 | 10 | 17 | 17 | 18 |
| Ignition loss (%) at 1000° C. after preliminary annealing at 400° C. | 0.2 | 0.4 |   | 0.4 | 0.5 | 0.2 |   |   | 0.3 |   |   |   |   | 0.5 | 0.6 | 0.5 |
| Peeling | − | + |   | + | + |   |   |   | + | + | o | + | + |   |   | + |
| Thermal conductivity W/mK 1150° C. | 2.0 | 1.4 | 1.4 | 1.15 | 1.2 |   |   |   | 1.2 |   | 1.2 |   |   |   |   | 1.1 |

We claim:

1. An unfired refractory structural member in the form of a plate, suitable for use as an expendable lining for a metallurgical vessel, comprising:
   20–100 parts by weight of magnesia sinter and 0–80 parts by weight of olivine, said magnesia sinter and olivine together having a grain size classification of 30–45% by weight of under 0.09 mm, and 55–70% by weight of 0.09–4 mm wherein 20–40% by weight of the total grains are over 1 mm,
   a pore-forming material selected from the group consisting of (a) 1–2.5 parts by weight of cork having a grain size of up to 1 mm wherein at least 70% by weight of the grains are over 0.1 mm, and (b) 2–10 parts by weight of granulated ceramic fibers having a grain size of up to 4 mm,
   2–4.5 parts by weight of a sodium phosphate, calculated as anhydrous phosphate, and
   0.2–2.5 parts by weight of at least one additive selected from the group consisting of refractory clay and Cr$_2$O$_3$,
   said structural member having an ignition loss of up to 0.6% by weight at 1000° C. after preliminary annealing at 400° C.

2. A structural member according to claim 1, wherein at least 70% by weight of said cork grains have a size of 0.5–1 mm.

3. A structural member according to claim 1, wherein said pore-forming material is 3–6 parts by weight of said granulated ceramic fibers.

4. A structural member according to claim 1, wherein the amount of said additive is 1–2 parts by weight.

5. A structural member according to claim 1, further comprising 0.2–1 part by weight of sodium bisulfate.

6. A structural member according to claim 5, wherein the amount of said sodium bisulfate is 0.4–1 part by weight.

7. A structural member according to claim 1, having an apparent density of 2.0–2.4 g/cm$^3$.

8. A structural member according to claim 7, wherein said apparent density is 2.1–2.3 g/cm$^3$.

9. A structural member according to claim 1, wherein said ceramic fibers are fibers of aluminum silicate containing 45% by weight of Al$_2$O$_3$.

10. A structural member according to claim 1, comprising both said magnesia sinter and said olivine, and wherein all of said magnesia sinter is in the form of a powder having a grain size of less than 0.1 mm.

11. A structural member according to claim 1, having a thickness of 1–6 cm.

12. A metallurgical vessel lined with the unfired refractory structural member of claim 1.

13. A metallurgical vessel according to claim 12, which is a tundish for use in continuous steel casting.

14. A metallurgical vessel according to claim 13, having a backup layer comprising 20–100 parts by weight of dry granulated magnesia sinter and 0–80 parts by weight of olivine, said backup layer being positioned between said tundish and said structural member.

15. A metallurgical vessel according to claim 14, wherein said backup layer has a thickness of at least 4 cm.

16. A prefabricated lining for a metallurgical vessel, comprising a plurality of the structural members of claim 1.

17. A structural member according to claim 1, wherein said sodium phosphate is a sodium polyphosphate.

* * * * *